United States Patent [19]

Brandt

[11] Patent Number: 4,912,816
[45] Date of Patent: Apr. 3, 1990

[54] SLIDE AND LINE CLOSURE DEVICE FOR SECURING WATERCRAFT TO A MOORING POST DAVIT, COLUMN OR THE LIKE

[76] Inventor: Kenneth Brandt, 10403 Sheldon Rd., Plymouth, Mich. 48170

[21] Appl. No.: 284,209

[22] Filed: Dec. 14, 1988

[51] Int. Cl.⁴ .................. F16G 11/00; B63B 21/00
[52] U.S. Cl. ..................... 24/129 R; 24/129 A; 114/230
[58] Field of Search ......... 24/129 R, 129 A, 132 WL, 24/335, 339, 17 A, 17 B; 114/218, 230

[56] References Cited

U.S. PATENT DOCUMENTS

| | | | |
|---|---|---|---|
| 71,393 | 11/1967 | Kuntz. | |
| 150,988 | 5/1874 | Taylor. | |
| 314,813 | 3/1885 | Ferris | 24/129 R |
| 366,971 | 7/1887 | Michaelis | 24/129 R |
| 1,807,314 | 5/1931 | Humphreys et al. | 24/129 R |
| 2,142,776 | 1/1939 | Behnke | 24/129 R |
| 2,151,609 | 3/1939 | Menderman | 24/129 R |
| 2,164,949 | 7/1939 | Schreiber | 24/129 R |
| 3,066,372 | 12/1962 | Parker | 24/129 R |
| 3,094,755 | 6/1963 | Casanave | 24/129 R |
| 3,584,606 | 4/1969 | Reidheed. | |
| 4,106,123 | 8/1978 | Freedman. | |
| 4,109,603 | 8/1978 | Guthmann. | |
| 4,118,059 | 10/1978 | Lindsay. | |
| 4,270,491 | 6/1981 | Cox. | |
| 4,414,712 | 3/1983 | Beggins. | |
| 4,578,894 | 4/1986 | Butera. | |
| 4,665,590 | 5/1987 | Udelhofen. | |

*Primary Examiner*—Victor N. Sakran
*Attorney, Agent, or Firm*—Dykema Gossett

[57] ABSTRACT

A device for fastening a line to an object, such as a mooring post or the like is of unitary construction having a bore therethrough through which a loop in the line is threaded. The device includes a cylindrical barrel portion which is adapted to be griped by user's hand, and a hub portion provided with a passageway through which one end of the line is threaded and knotted in order to secure the line to the device. The hub provides a shoulder against which the user's hand may bear to exert a force on the device in order to create slack in the loop to permit removal thereof from the anchoring object.

16 Claims, 2 Drawing Sheets

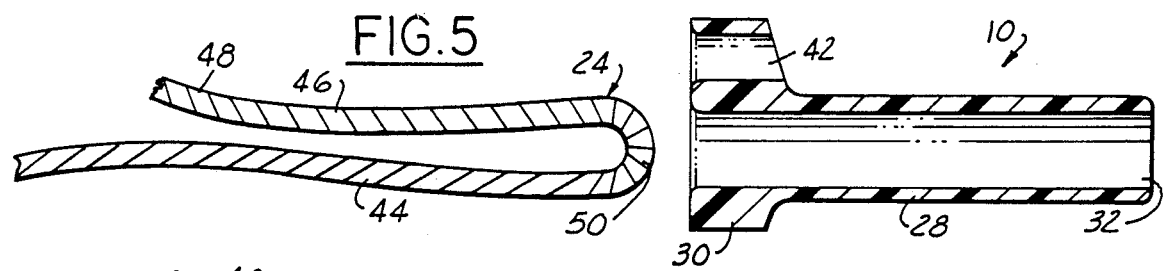
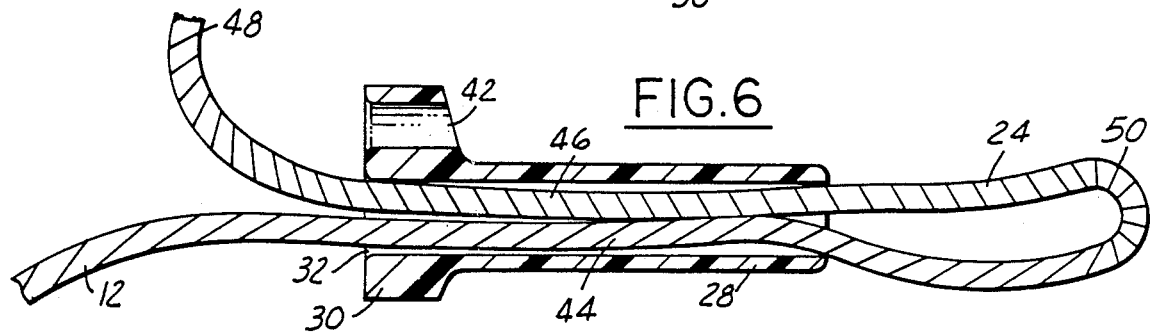
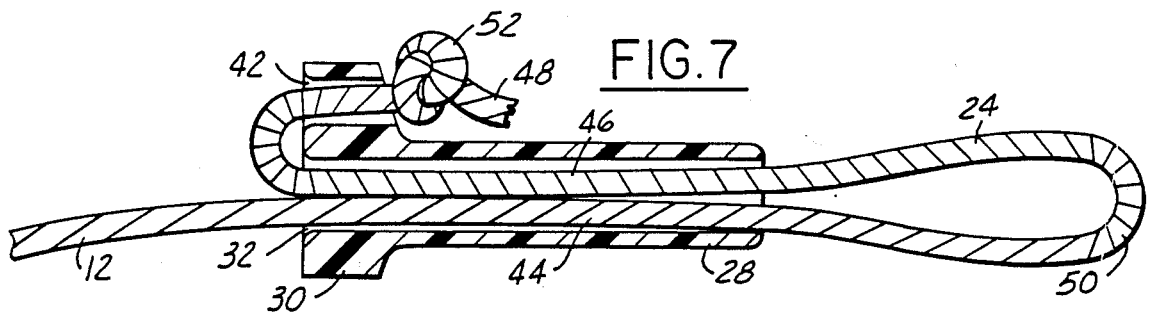
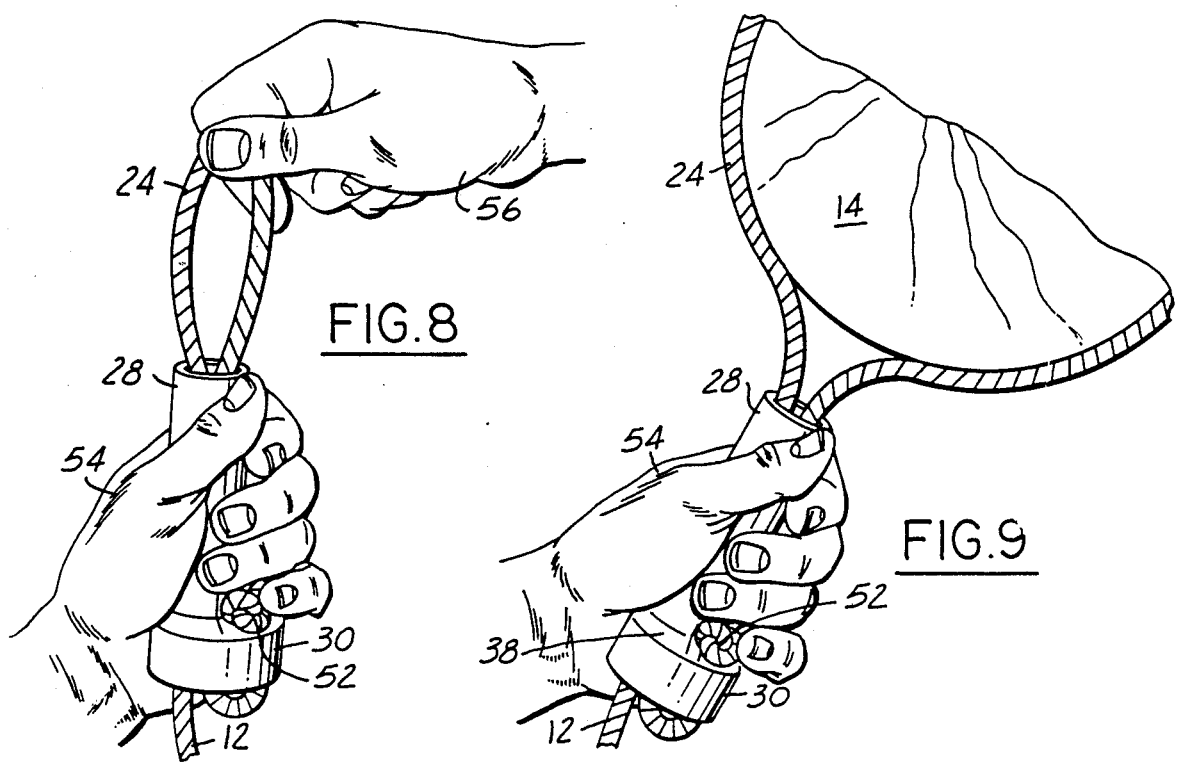

SLIDE AND LINE CLOSURE DEVICE FOR SECURING WATERCRAFT TO A MOORING POST DAVIT, COLUMN OR THE LIKE

TECHNICAL FIELD

The present invention generally relates to line fastening devices and mooring devices, an deals more particularly with a device for forming an eye or loop in a line and for fastening the line around objects, such as a mooring post, without the use of a knot.

BACKGROUND ART

Numerous types of fastening devices have been devised in the past for fastening lines to objects, such as mooring posts or the like. For example, watercraft are typically secured to a dock or the like by means of ropes or lines which are tied between cleats or eyes on the watercraft, and mooring posts, cleats or columns on the dock. This normally necessitates forming at least one or more knots in at least one end of the mooring line. The use of knots in this context are sometimes undesirable for a number of reasons including the fact that it takes additional time to tie a proper knot, some lay persons are not sufficiently skilled to tie a proper knot, and the knots are sometimes difficult to untie.

In an effort to eliminate the need for tying and untying knots, and to provide a more easily manageable mooring technique, several devices have been proposed in the past. For example, U.S. Pat. No. 4,414,712 discloses a line tying device for forming and holding an eye in a line without the use of a knot, however this device is somewhat complicated and cumbersome in the manner in which the line must be threaded through the device to form the loop, and the manner in which the line is secured to the device.

Similarly, U.S. Pat. No. 4,109,603 discloses a boat mooring device which, although simple in construction, also requires threading the line through multiple apertures in the device, and moreover, the means by which the line is secured to the device is less than completely satisfactory.

Most of the prior art devices mentioned above do not readily lend themselves to quick release of the loop for the reason that they are difficult for a user to grasp and pull, especially when wet. Thus, there is a need in the art for a line fastening device of the type which forms a slip loop to be fastened around an object, which is easily manufactured, easy to attach to a line or rope and is easily manipulated to tighten or loosen the loop from the object. The present invention satisfies these needs and essentially obviates each of the disadvantages of the prior art devices discussed above.

SUMMARY OF THE INVENTION

According to the present invention, a device is provided for fastening a line to a post or the like, in which a slip loop is formed in the end of a line which is positioned around the post and then tightened simply by pulling on the line. The device includes an elongate barrel having an axial bore therethrough, wherein the bore has a sufficient cross-sectional area to slidably receive therein two sections of the end of the line, in side-by-side relationship to each other. A third section of the line between the first two sections extends away from one end of the barrel and forms the loop to be fastened around the post or the like. The device further includes a lateral extension connected on the opposite end of the barrel which includes a passageway therethrough. The end of the line passes through the central bore of the barrel, out of the opposite end of the barrel, and through the passageway of the extension, where it is tied in a knot to thereby secure the line to the device. In a preferred form of the invention, the lateral extension is defined by a circumferential extending hub or base which includes an inclined surface against which a user will apply pressure with his hand in order to slide the device along the line and thereby loosen the slip loop. The barrel and lateral extension are preferably of integral, unitary construction, formed by injection plastic molding, or a similar process.

BRIEF DESCRIPTION OF THE DRAWINGS

In the drawings, which form an integral part of the specification and are to be read in conjunction therewith, and in which like reference rules are employed to designate identical components and the various views:

FIG. 5 is a cross-sectional view of the device and a line having a loop formed therein just before the loop has been inserted into the barrel of the device;

FIG. 6 depicts a further step in securing the line to the device, in which the loop has been inserted completely through the barrel and the end of the line is about to be threaded through the passageway in the lateral extension of the device;

FIG. 7 is a cross-sectional view similar to FIG. 6, after the end of the line has been secured to the lateral extension by means of a knot;

FIG. 8 is a perspective view depicting the device held in one of the user's hand while the other hand is employed to enlarge the size of the line loop; and FIG. 9 is a perspective view showing the line wrapped around a mooring post, and the technique that is used to loosen the loop, prior to removing it from the post.

DETAILED DESCRIPTION OF THE PREFERRED EMBODIMENT

Figure 1:
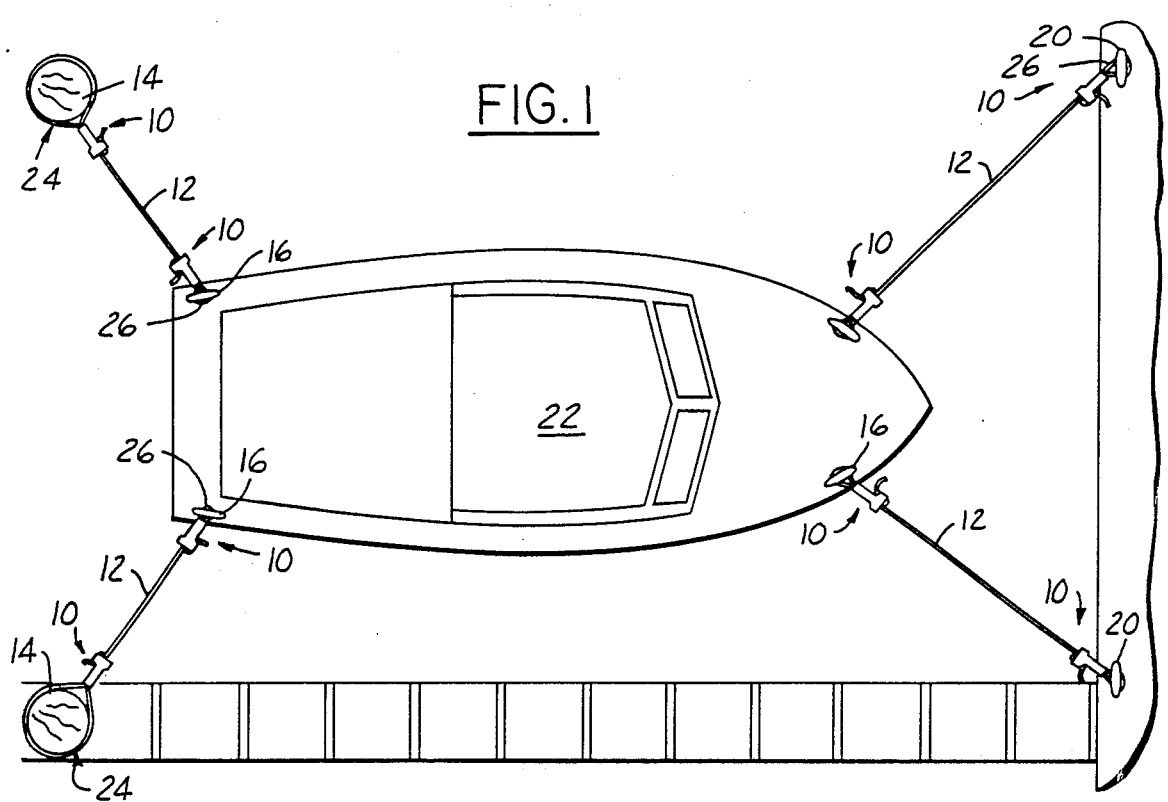
FIG. 1 is a plan view of a watercraft tied to mooring posts and cleats by lines which employ the line fastening device which forms the preferred embodiment of the present invention.
Figure 2:
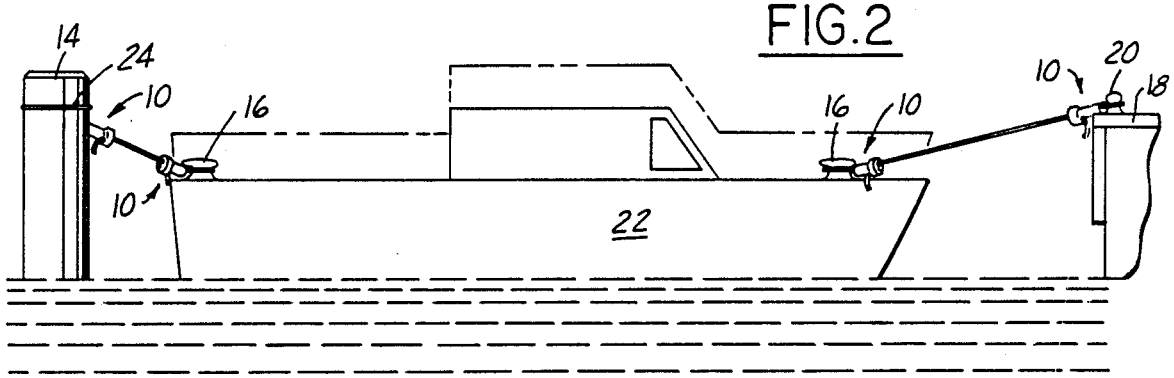
FIG. 2 is a side elevational view of the watercraft and mooring post depicted in FIG. 1, an elevated position of the watercraft during higher tides being indicated in the phantom.

Referring first to FIGS. 1 and 2, the present invention generally relates to a device for fastening a line to an object without having to tie knots, in a manner in which is easily manageable and permits quick removal from the object, when desired. For illustrative purposes, FIGS. 1 and 2 depict the device, generally indicated by the numeral 10, as being employed to fasten mooring lines 12 between a watercraft 22 and various anchoring means, such as mooring posts 14, and cleats 20 which are stationarily secured to a pier 18. However, it is to be expressly understood that the device 10 may be employed in various other applications, where slip loops are desirable.

Each of the lines 12 includes a fastening device 10 at each end thereof to respectively form two loops 24, 26 in the line 12. As best seen in FIG. 1, a first pair of the devices 10 is employed to fasten the ends of two lines to cleats 16 on the rear of the watercraft 22, and a second pair of the devices 10 on the rear lines 12 fasten the lines to mooring posts 14. In a similar manner, the forward cleats 16 of the watercraft 22 are secured to the pier cleats 20 by means of forward mooring lines 12, each of which includes a line fastening device 10 at each end thereof. As will be discussed below, the fastening devices 10 allow quick fastening to and unfastening of the lines 12 from any of various types of anchoring devices.

Figure 4:
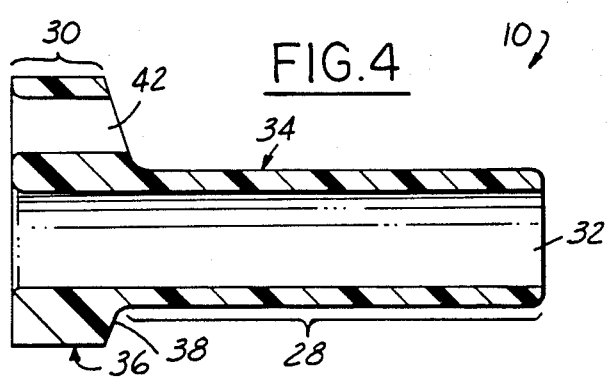
FIG. 4 is a sectional view taken along the line 4—4 of FIG. 3.
Figure 3:
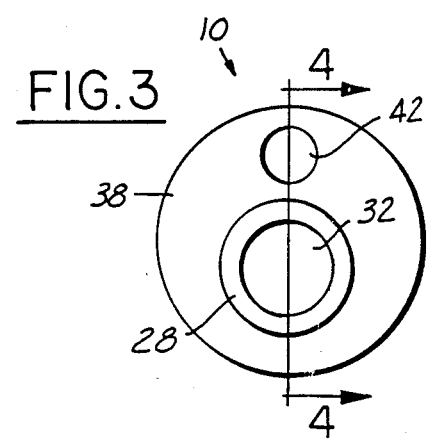
FIG. 3 is a view of one end of the device.

Referring now to FIGS. 3 and 4, the line fastening device 10 includes a barrel portion 28 having a bore 32 axially therethrough and a cylindrical outer surface 34. The bore 32 possesses a maximum cross-sectional dimension which is sufficient to accommodate therein two sections of the line 12, and side-by-side relationship to each other, so that either section can slide through the bore 32. On one end of the handlelike barrel portion 28, there is provided a lateral extension 30 in the form of a base or hub 30. The hub 30 includes an exterior cylindrical surface 36 and has a central axis which is radially offset from that of the barrel portion 28. On one side of the barrel 28, there is formed in the hub 30, a passageway 42 whose axis is essentially parallel to that of the bore 32. The hub 30 includes a circumferentially extending bevel surface forming a shoulder 38 which is inclined relative to the axis of the bore 32.

The size of the device, and various features thereof including the diameter of the bore 32 will vary, depending upon the application and the size of the rope or line to be fastened. However, it is desirable that the length of the barrel 28 be sufficient to allow a user to grasp it, and likewise the size of the shoulder 38 should be sufficient to allow at lest part of a user's hand to rest against and apply pressure to it while he grasps the barrel 28.

The device 10 is preferably of unitary construction, with the barrel 28 and hub 30 formed integral with each other. For example, device 10 can be manufactured from plastic, using common injection molding techniques.

Referring now to FIG. 5, in order to fasten the device 10 to the line 12, the end of the line 12 is folded so as to form a loop defined by two overlapping essentially straight sections 44, 46, and a bite portion 50 therebetween. The bit 50 is first inserted into one end of the bore 32 and the loop is passed completely through the bore 32 until it extends outwardly from one end of the barrel portion 28. The end 48 of the line, which extends from the other end of the bore 32 is then threaded through the passageway 42 and is tied into a knot 52, as shown in FIG. 7, so as to secure the line 12 to the hub 30.

Attention is now directed to FIGS. 8 and 9 which depict the manner of use of the line fastening device 10. One of the user's hand 54 grasps the barrel portion 28 while the other hand 56 pulls on the loop 24 so as to draw the line (section 44) through the bore 32 in order to increase the diameter of the loop 24 so that it is sufficient to extend around an anchoring object, such as the mooring post 14 shown in FIG. 9. With the loop 24 positioned around the anchoring object, the loop24 is tightened by simply pulling on the line 12 at a point distal from the device 10. Having secured the line in this fashion to the anchoring means, the slip loop 24 remains tight as long as there is some degree of tension on the line 12.

In order to release the loop 24 from the mooring post 14, the user grasps the barrel 28 with one hand 54, as shown in FIG. 9 and simply pulls axially on the device 10, in the direction of the line 12, away from the mooring post 14. As the user pulls on device 10, the section 44 of the line 12 slides through the barrel 28 and force is exerted on the end of the line during this procedure as a result of the end 48 of the line having been secured to the hub 30. Quick release of the loop 24 is facilitated by the fact that the user can exert axial force against the shoulder 38 of the device 10 since the hub 30 is positioned so that a portion of the user's hand 54 or his fingers rest against the shoulder during a release procedure.

From the foregoing, it is apparent that the device described above provides for the reliable accomplishment of the objects of the invention, and does so in a particularly simple and effective manner. It is recognized, of course, that those skilled in the art may make various modifications or additions to the preferred embodiment chosen to illustrate the invention without departing from the spirit and scope of the present contribution to the art. Accordingly, it is to be understood that the protection sought and to be afforded hereby shall be deemed to extend to the subject matter claimed and all equivalents thereof fairly within the scope of the invention.

What is claimed is:

1. A device for fastening a line to a post or the like, comprising:

an elongate barrel having an axial bore therethrough, said bore having a cross-sectional area sufficient to slidably receive therein two sections of the line in side-by-side relationship to each other;

a third section of the line being connected with said two sections and extending away from one end of said barrel, said third section of said line forming a slip loop adapted to be positioned around said post such that pulling on one of said sections of the line tightens said slip loop around said post, said two sections frictionally engaging each other; and a lateral extension on said barrel, said lateral extension including a passageway therethrough for receiving an end of the line therethrough and including an outer surface area surrounding said passageway against which a bulge in the end of the line may bear to secure the line on said device.

2. The device of claim 1, wherein said barrel includes an outer cylindrical surface forming a handle which can be grasped by a user of said device.

3. The device of claim 2, wherein said lateral extension is defined by a hub surrounding one end of said barrel.

4. The device of claim 3, wherein said hub is formed integral with said barrel.

5. The device of claim 3, wherein said hub includes a radially extending shoulder against which the hand of a user grasping said barrel may bear.

6. The device of claim 5, wherein said passageway extends through said shoulder.

7. The device of claim 6, wherein said surface area is defined on said shoulder, and is inclined relative to the longitudinal axis of said barrel.

8. The device of claim 1, wherein said device is of unitary construction.

9. A mooring line assembly for connecting a water vessel or the like to a mooring post, comprising:

a water vessel having at least one cleat;

a flexible line, such as a rope, having one end attached to said cleat;

a device for maintaining a slip-loop in said line, including an elongate handle portion having a bore longitudinally therethrough, said line extending from said one end through said bore, forming a slip-loop at one end of said handle and returning back through said bore such that two sections of said line are disposed in side-by-side relationship to each other and slidable within said bore, and wherein said slip-loop is defined between said two line sections and extends from one end of said elongate handle portion; and, a base portion on the other end of said elongate handle portion, said base portion extending radially outward from said elongate handle portion and having the other end of said line secured thereto.

10. The mooring line assembly of claim 9, wherein said handle portion includes an essentially cylindrical outer surface.

11. The mooring line assembly of claim 9, wherein said two sections of said line frictionally engage each other within said bore.

12. The mooring line assembly of claim 9, wherein one of said two sections of said line extends out of said bore in said other end of said handle portion and into said base.

13. The mooring line assembly of claim 9, wherein said base includes a circumferentially extending shoulder against which a part of user's hand grasping said handle portion may bear.

14. The mooring line assembly of claim 9, wherein said base includes a passageway therethrough extending generally in the same direction as said bore, and one end of said line extends through said passageway and includes an enlarged portion having a maximum cross-sectional dimension greater than that of said passageway to secure said one end of said line to said base.

15. The mooring line assembly of claim 13, wherein said passageway is parallel to said bore such that said enlarged portion, or knot, transmits a force from said line to said handle portion along an axis parallel to the movement of the line within the bore.

16. The mooring line assembly of claim 9, wherein said one end is attached to said cleat with a second elongate handle portion identical to said elongate handle portion.

* * * * *